(12) United States Patent
Miyamoto et al.

(10) Patent No.: US 6,414,231 B1
(45) Date of Patent: Jul. 2, 2002

(54) MUSIC SCORE DISPLAY APPARATUS WITH CONTROLLED EXHIBIT OF CONNECTIVE SIGN

(75) Inventors: Hiromu Miyamoto; Ayumi Fukata, both of Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 114 days.

(21) Appl. No.: 09/655,692

(22) Filed: Sep. 6, 2000

(30) Foreign Application Priority Data

Sep. 6, 1999 (JP) .......................................... 11-251597

(51) Int. Cl.⁷ .............................................. G09B 15/02
(52) U.S. Cl. .................. 84/477 R; 84/DIG. 6
(58) Field of Search ........................ 84/470 R, 471 R, 84/477 R, 478, 479 R, 479 A, 482, 483.1, 483.2, DIG. 6

(56) References Cited

U.S. PATENT DOCUMENTS

| | | | |
|---|---|---|---|
| 5,038,659 A | | 8/1991 | Satoh et al. |
| 5,690,496 A | | 11/1997 | Kennedy |
| 6,150,597 A | * | 11/2000 | Kakishita et al. ......... 84/477 R |
| 6,166,313 A | * | 12/2000 | Miyamoto ................ 84/477 R |
| 6,313,387 B1 | * | 11/2001 | Yamauchi ............. 84/477 R X |

* cited by examiner

*Primary Examiner*—Stanley J. Witkowski
(74) *Attorney, Agent, or Firm*—Morrison & Foerster LLP

(57) ABSTRACT

A music score with notes and signs in musical notation is displayed on the screen of a computer system using musical data representing events of notes and signs for a musical performance. The score is editable by moving a note from the exhibited position to another position on the screen. In case the moved note is connected with another note by a connective sign such as a slur, a slide, a bending (i.e. choking) and a hammering-on, the connective sign is also moved to the new position of the moved note. When the notes connected by the connective sign cannot be displayed on the same screen window, the connective sign is exhibited in a special fashion to indicate the associated connection. When the score is expressed in a tablature notation, appropriate modifications are employed to indicate correct manipulative operations for the instrument player.

19 Claims, 13 Drawing Sheets

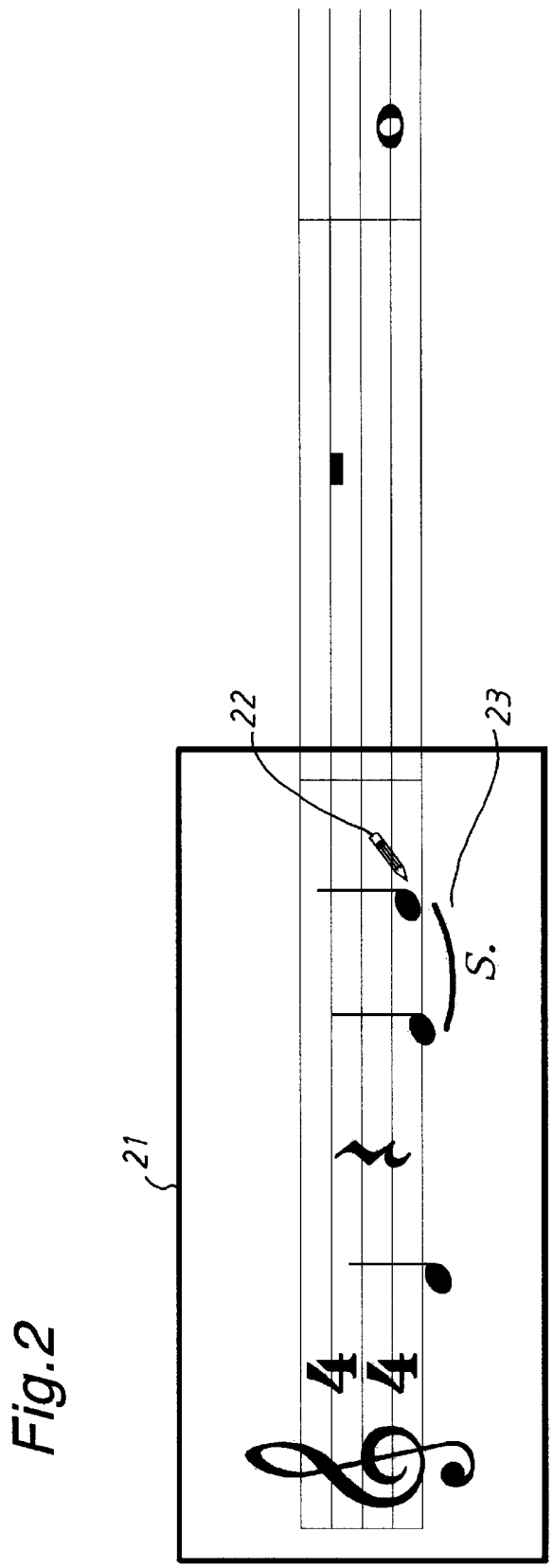

Music Piece Data File
(Performance Progression Data)

Sign Particulars Data File

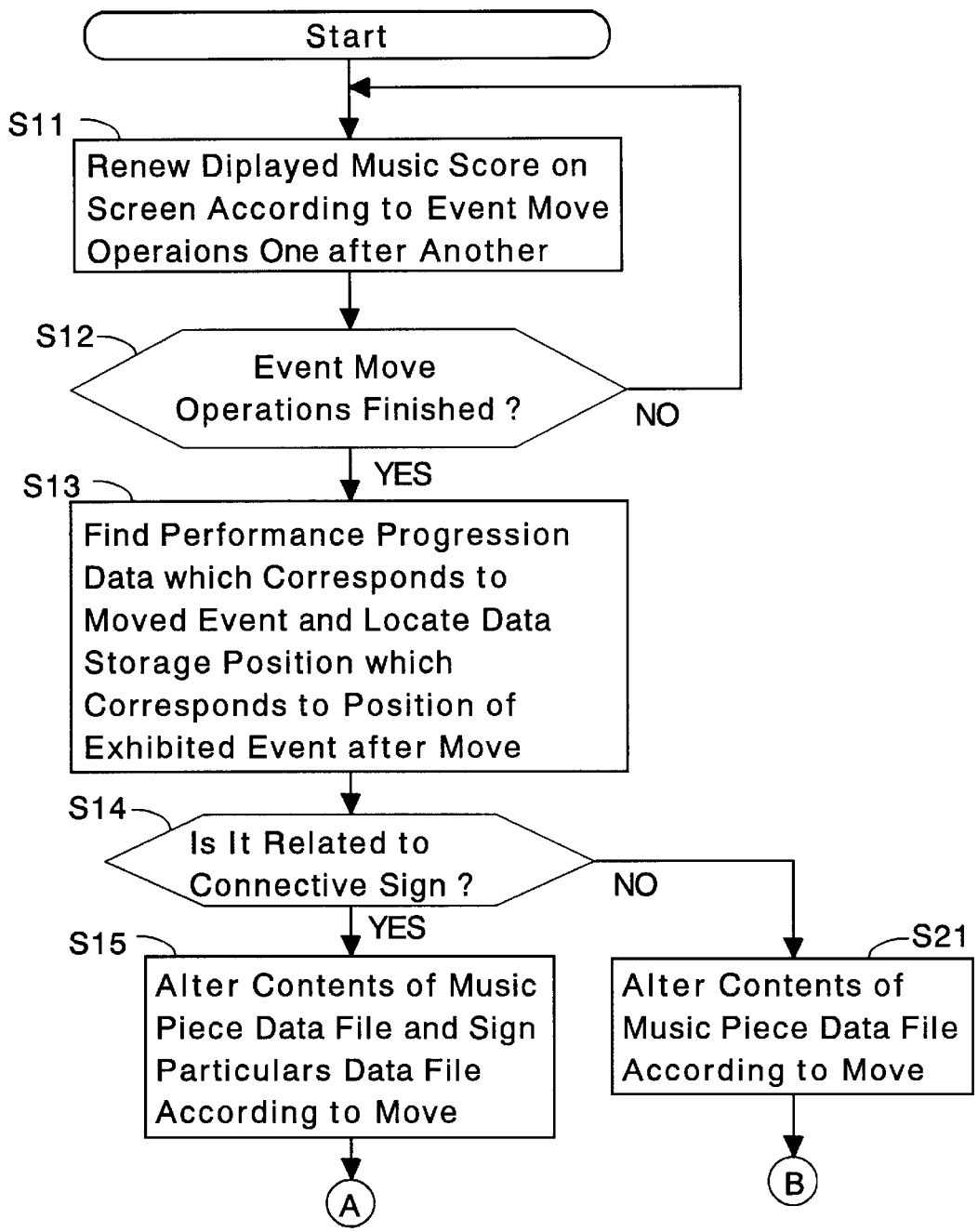
Fig.6a  Event Move Processing

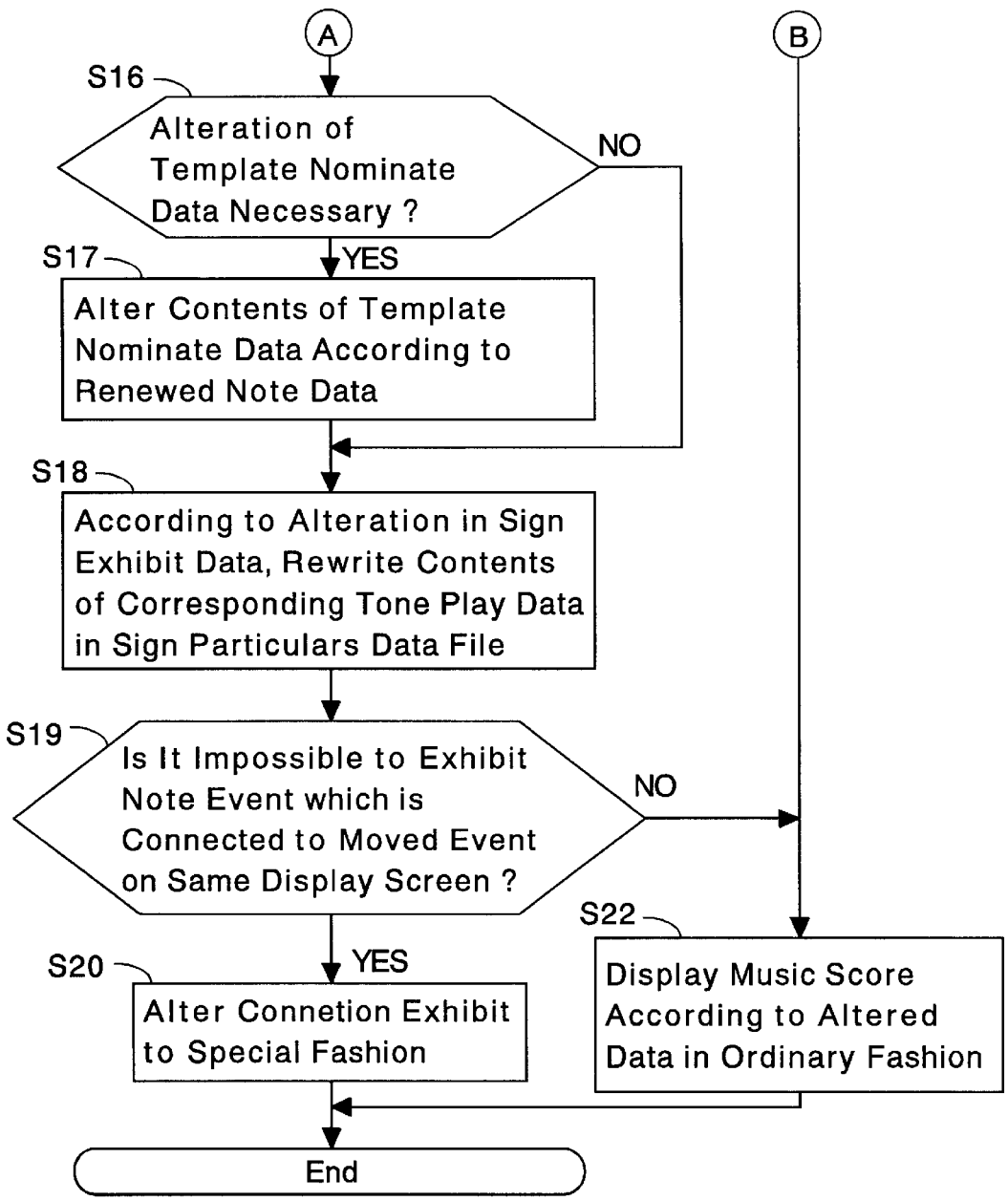

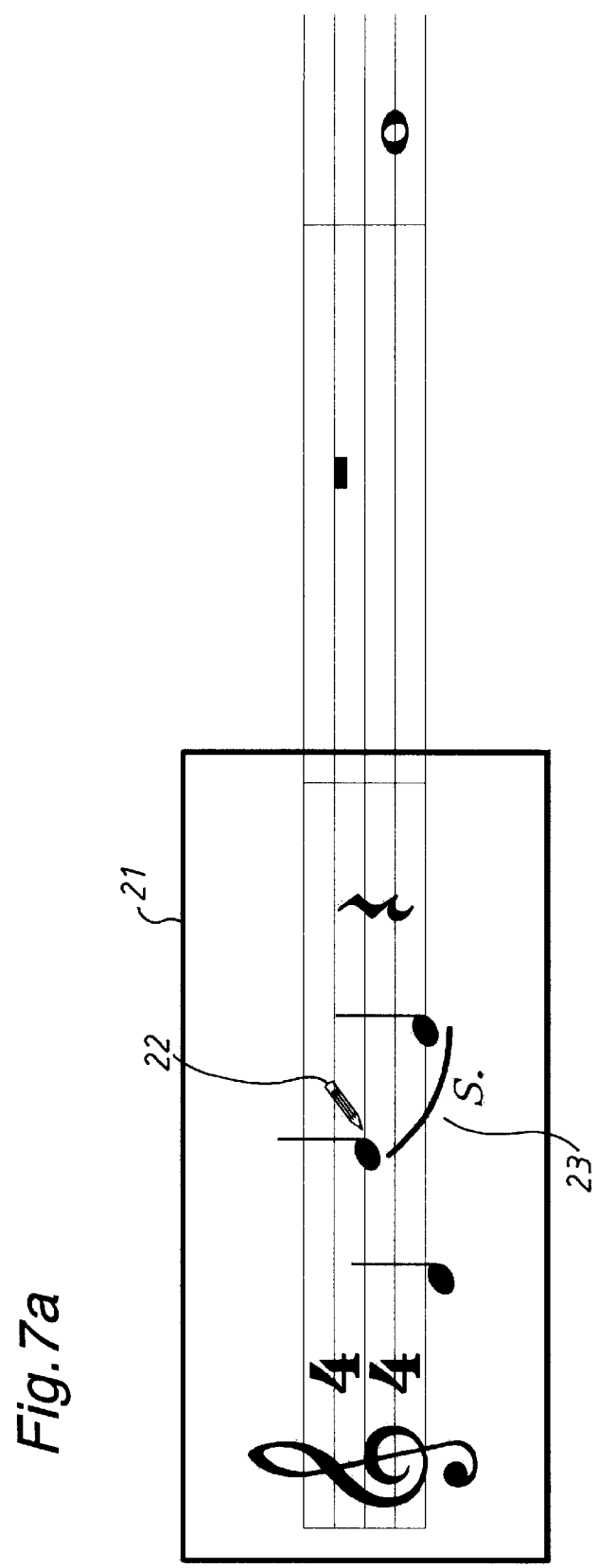

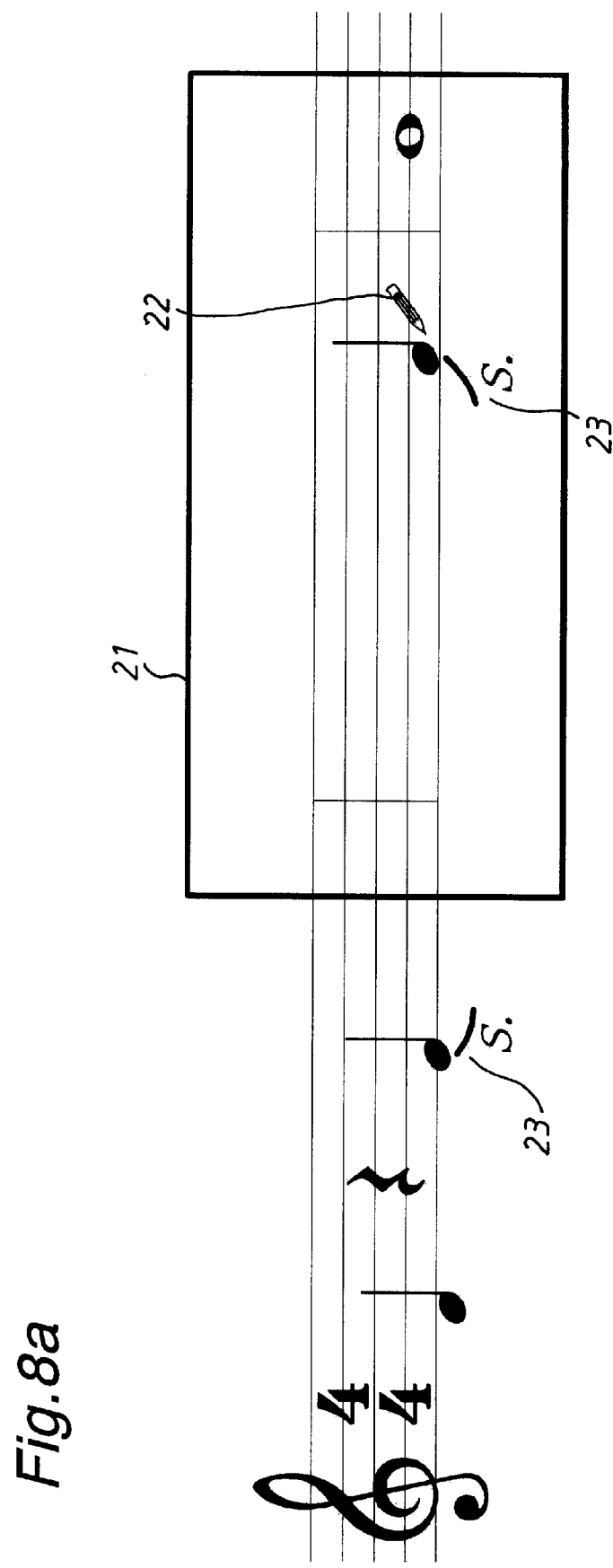

Fig. 8c

43 Tone Play Data

| Time Point (48) | Kon (64) / ST (24) / GT (140) | Time Point (c) | Pitch Bend (c) | ~ | Return |

Fig. 8b

42 Sign Exhibit Data

| Slide-Up | Time Point (48) | Kon (64) / ST (24) / GT (20) | Time Point (0) | Time Point (72) | Kon (65) / ST (24) / GT (20) | Return |

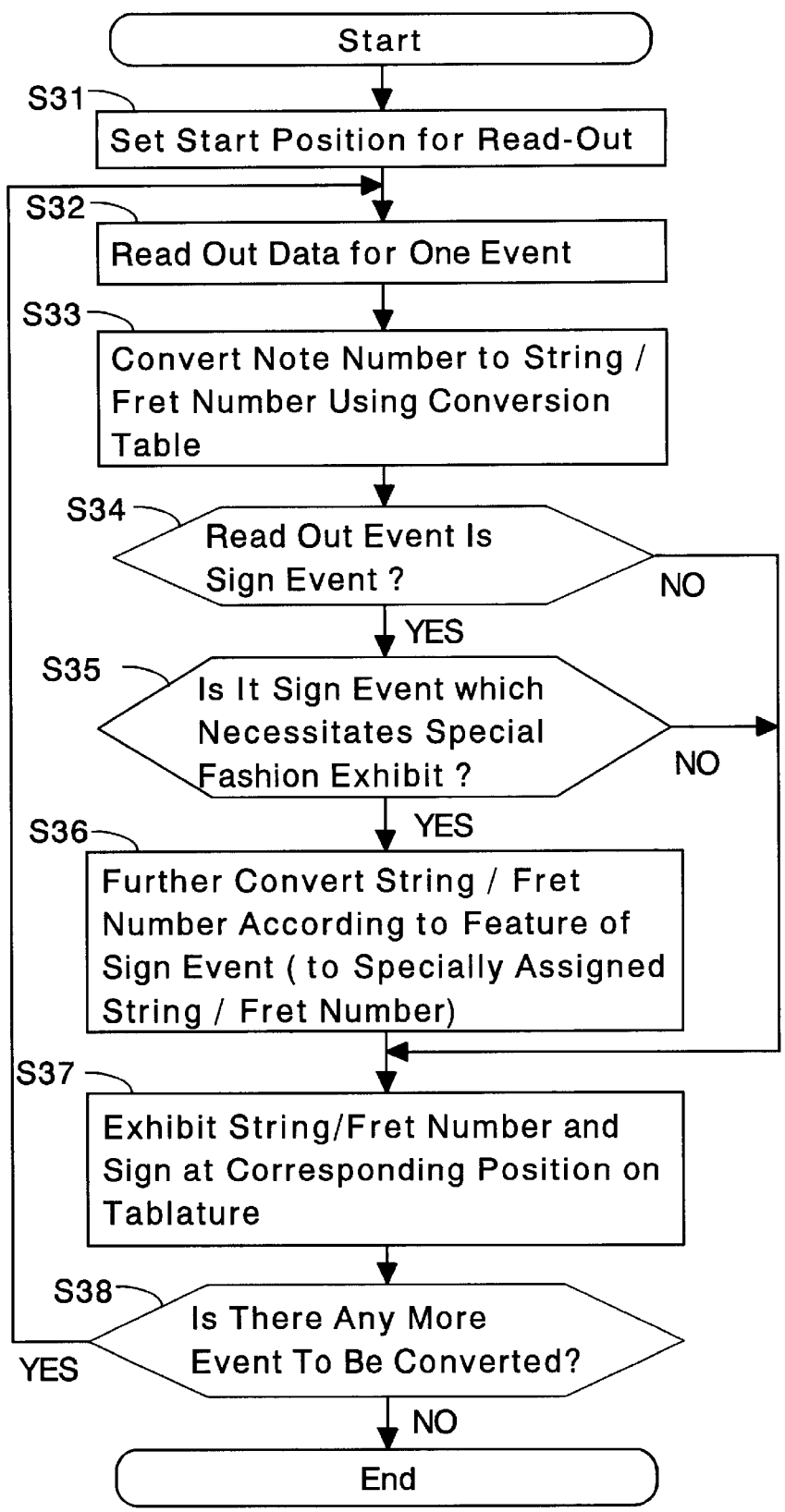

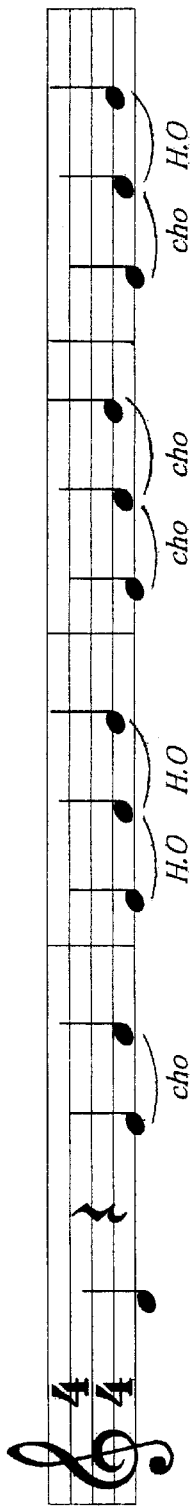
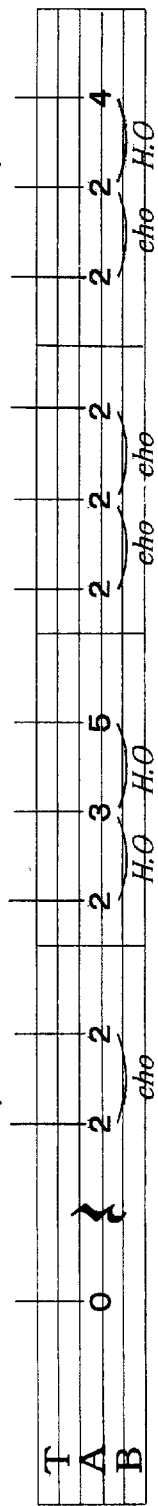
Fig 10

MUSIC SCORE DISPLAY APPARATUS WITH CONTROLLED EXHIBIT OF CONNECTIVE SIGN

BACKGROUND OF THE INVENTION

1. Field of the Invention

The present invention relates to an apparatus for displaying a musical score with notes and signs in musical notation on the display screen of a computer system using musical data representing events of notes and signs for a musical performance, and more particularly to such an apparatus which permits the displayed score to be edited by moving a note from the existing position to another position on the screen, whereby a connective sign such as a slur, a slide, a bending and a hammering-on which connects plural notes is also moved on the screen together with the moved note keeping the connection with other connected note or notes. The present invention further relates to such an apparatus as above which also displays a tablature with appropriate exhibits of strings and fret numbers for the notes associated with a connective sign. The present invention also provides a computer program which configures the above apparatus using a computer system.

2. Description of the Prior Art

There has conventionally been known in the art an apparatus of a data processing type which displays a music score on the display screen based on musical data and prints the music score on paper in the style exhibited on the screen, as well as computer software for configuring such an apparatus using a computer system. There has also been known in the art sequencer software which displays a music progression in a piano roll style or in a music score style (ordinary musical notation), and which permits edition of the music by pointing an intended note or notes on the screen and altering the pitch or duration of the note or deleting or inserting a note or notes in the displayed music.

Using such an apparatus or software, graphical edition of a music score is possible by inserting or deleting notes or signs at positions pointed by a mouse or the like device, or changing the positions in the music score displayed on the screen. It is also possible to edit plural notes connected by a connective sign such as a slur by altering the order of the notes (in the sequence) or lengthening or shortening the distances between the notes which are connected by a connective sign.

There has further been known in the art a apparatus or software which possesses a function of altering the style of displaying a music on the screen, such as from the ordinary notation of music using five-line staves to a different notation such as a tablature. Tablature is a kind of music notional system in which a plurality of horizontal lines indicate corresponding strings of the musical instrument and numerals positioned on the lines indicate the frets to press the string, and a tablature for the guitar, for example, comprises six horizontal lines to represent, from top to bottom, the first through sixth strings, numerals to indicate the fret positions and tails to indicate the durations of the notes.

According to such prior art apparatus or software, it is possible to change the aligning order of a plurality of notes, however, in case there is a connective sign such as a slur connecting those plurality of notes, the connective sign would not be changed on the display screen or a connective sign which has lost its association with the note would be automatically deleted, thereby change merely the location of the note or notes. This does not necessarily display the correct musical score as intended by the operator of the edition. Further, an apparatus for creating (composing) a music performance data file can only create a music performance data file which corresponds to the display on the screen, and therefore would not be able to provide a music performance data file which meets the intention of the user (composer).

Further, in the case where an edition operation to lengthen (expand) the distance between the notes connected by a connective sign takes place, the sign itself would be elongated according to the distance between the notes. If the distance is greater than the span of a single screen range exhibiting the images at one time, the plurality of notes would not be exhibited on the single screen at a time concurrently with the associated sign simply elongated in its ordinary fashion. Then it would not be easily understood what notes on the screen are associated with what kind of sign. A too lengthy sign exhibited across the screen would hinder the displayed music score to make it less understandable. Further in the case of tablature notation, it has not been possible to exhibit fret numbers which matches a special playing manner on the instrument such as a bending, which means that the prior art apparatus or software cannot present a correct tablature for the user if the performance includes special manipulative manners with respect to the string and the fret number for the note.

SUMMARY OF THE INVENTION

It is, therefore, a primary object of the present invention to solve the above-mentioned drawbacks involved in such a conventional apparatus or software of displaying music score data and permitting edition thereon, and to provide a music score display apparatus and software therefor which exhibits a music score that is easily and correctly understandable by the player with respect to the connective signs and the associated notes.

It is, further, an object of the present invention to provide a music score display apparatus and software which permits the correct alteration of the exhibited connective sign in accordance with the change in the order of the aligned notes or with the move of a note or notes associated with the connective sign.

It is, still further, an object of the present invention to provide a music score display apparatus and software which permits a clear and easily understandable exhibit of the notes and the signs, indicating what kind of connective sign is associated with which notes in the score, even in the case that any other of the notes connected with a connective sign would be out of sight from the instant screen.

It is, still further, an object of the present invention to provide a music score display apparatus and software which permits correct indications for the player, even in the case that the music score is displayed in a different notation from the ordinary one by converting the data for the ordinary notation to the data for such a different notation.

In order to accomplish the object of the present invention, the invention provides a music score display apparatus comprising: a musical data providing module which provides musical data representing events of notes and events of signs for a musical performance, the signs including at least one connective sign connecting plural notes; a display module which displays on a display screen a music score by exhibiting the events in musical notation based on the musical data; an edit module which permits edition of the music data by moving at least one exhibited note event at one position to another position on the score; and an alteration module which, in case the moved note event is connected with another note event with an exhibited connective sign, is capable of altering the exhibited connective sign, thereby keeping association of the exhibited connective sign with the moved note event and the other note event.

The connective sign may be such as a tie, a slur, a slide, a bending and a hammering on. The note event may be moved in the direction of note pitch, or in the direction of time progression, or in the both directions. The musical data may include sign exhibit data for exhibiting a sign event and note play data for playing notes according to the sign event, and in case the sign exhibit data might be altered, the note play data which correspond to the sign event may also be altered. A music score display apparatus may further comprise a tone play data creating module which creates tone play data indicative of tones to be played for realizing a performance as designated by the connective sign, the tone play data creating module including at least one template defining a manner of change in tone pitch; wherein the sign exhibit data may include template nominating data which nominates a template for nominating a template to be employed for the note event associated with the sign exhibit data, and the sign exhibit data may further include note data to be associated with the sign exhibit data. The tone play data creating module may create tone play data based on the template nominated by the template nominating data and on the note data for which the template is to be employed. The tone play data creating module may select an appropriate template from at least one template and rewrites the tone play data in accordance with the moving of the note event.

In order to further accomplish the object of the present invention, the invention provides a music score display apparatus comprising: a musical data providing module which provides musical data representing events of notes and events of signs for a musical performance, the signs including at least one connective sign connecting plural notes; a display module which displays on a display screen a music score by exhibiting the events in musical notation based on the musical data; and a display control module which controls the display module to exhibit a connective sign in a special fashion which is different from the ordinary fashion of exhibiting the connective sign, in case the notes connected by the connective sign cannot be exhibited on one screen range concurrently.

The special fashion may be an exhibit of a fractional part of the connective sign and a character indicating the connective sign. A music score display apparatus may further comprise an edit module which permits edition of the music data by moving at least one exhibited note event at one position to another position on the score, in which the display control module controls the display module to exhibit a connective sign in the special fashion, in case the notes connected by the connective sign cannot be exhibited on one screen range concurrently as a result of the moving of the note event.

In order to still further accomplish the object of the present invention, the invention provides a music score display apparatus comprising: a musical data providing module which provides musical data representing events of notes and events of signs for a musical performance, the signs including at least one connective sign connecting plural notes; a display module which displays on a display screen a music score by exhibiting the events in musical notation based on the musical data; a tablature data providing module which provides tablature data for exhibiting the events in tablature notation from the musical data, the tablature notation including strings and fret numbers of a stringed musical instrument; a display control module which controls the display module to display a tablature for the musical performance based on the tablature data corresponding to the musical notation.

The display control module may control the display module to exhibit a first note event in a special fashion in case a sign event associated with the first note event is of a first category which necessitates a special fashion exhibition whereas to exhibit a second note event in an ordinary fashion in case a sign event associated with the second note event is of a second category which does not necessitate a special fashion exhibition. The sign event of the first category may be bending (i.e. choking) and arming. The sign event of the second category may be hammering on, pulling, trill and slide. The display control module may control the display module to exhibit the fret numbers corresponding to the notes in the ordinary relation in case the associated sign event is of the second category whereas to exhibit the fret numbers corresponding to the notes in a special relation which is specifically defined depending on the sign event and is different from the ordinary relation in case the associated sign event is of the first category.

As will be understood from the above description about the apparatus for displaying a music score, a sequence of steps each performing the operational function of each of the structural element modules of the above music score display apparatus will constitute an inventive method for displaying a music score data set according to the spirit of the present invention.

Further as will be understood from the above description about the apparatus and the method for displaying a music score data set, a storage medium containing a program executable by a computer system, which program comprising program modules for executing a sequence of the processes each performing the operational function of each of the structural element modules of the above music score displaying apparatus or performing each of the steps constituting the above music score displaying method will reside within the spirit of the present invention.

Further as will be apparent from the description herein later, some of the structural element modules of the present invention are configured by a computer system performing the assigned functions according to the associated programs. They may of course be hardware structured discrete devices performing the same functions.

The present invention may take form in various components and arrangement of components including hardware and software, and in various steps and arrangement of steps. The drawings are only for purposes of illustrating a preferred embodiment and processes, and are not to be construed as limiting the invention.

BRIEF DESCRIPTION OF THE DRAWINGS

For a better understanding of the present invention, and to show how the same may be practiced and will work, reference will now be made, by way of example, to the accompanying drawings, in which:

FIG. 2 is a chart showing an example of a music score and a region of the score which is displayed on the display screen;

FIGS. 6a and 6b are, in combination, a flow chart showing an example of the event move processing according to the present invention;

FIG. 7a is a chart showing an example of a music score and a region of the score which is displayed on the display screen, after moving the note and the sign;

FIG. 8a is a chart showing another example of a music score and a region of the score which is displayed on the display screen, after moving the note and the sign;

FIGS. 8b and 8c are charts showing data configurations of examples of sign exhibit data and tone play data, respectively, in the present invention;

FIG. 9 is a flow chart showing an example of the tablature exhibit processing according to the present invention; and FIG. 10 is a chart showing examples of the conversion from the ordinary musical notation to the tablature notation according to the present invention.

DESCRIPTION OF THE PREFERRED EMBODIMENTS

The music score display apparatus of the present invention may be practiced as a specialized hardware structured apparatus, and may be practiced as a computer configured system operated by an application software program.

Hereinbelow will be described an embodiment practiced on a general personal computer operated with a sequence program capable of editing musical data on a music score edit mode. The present invention will be operated with a control program for editing and exhibiting a musical score with notes and signs.

Figure 1:
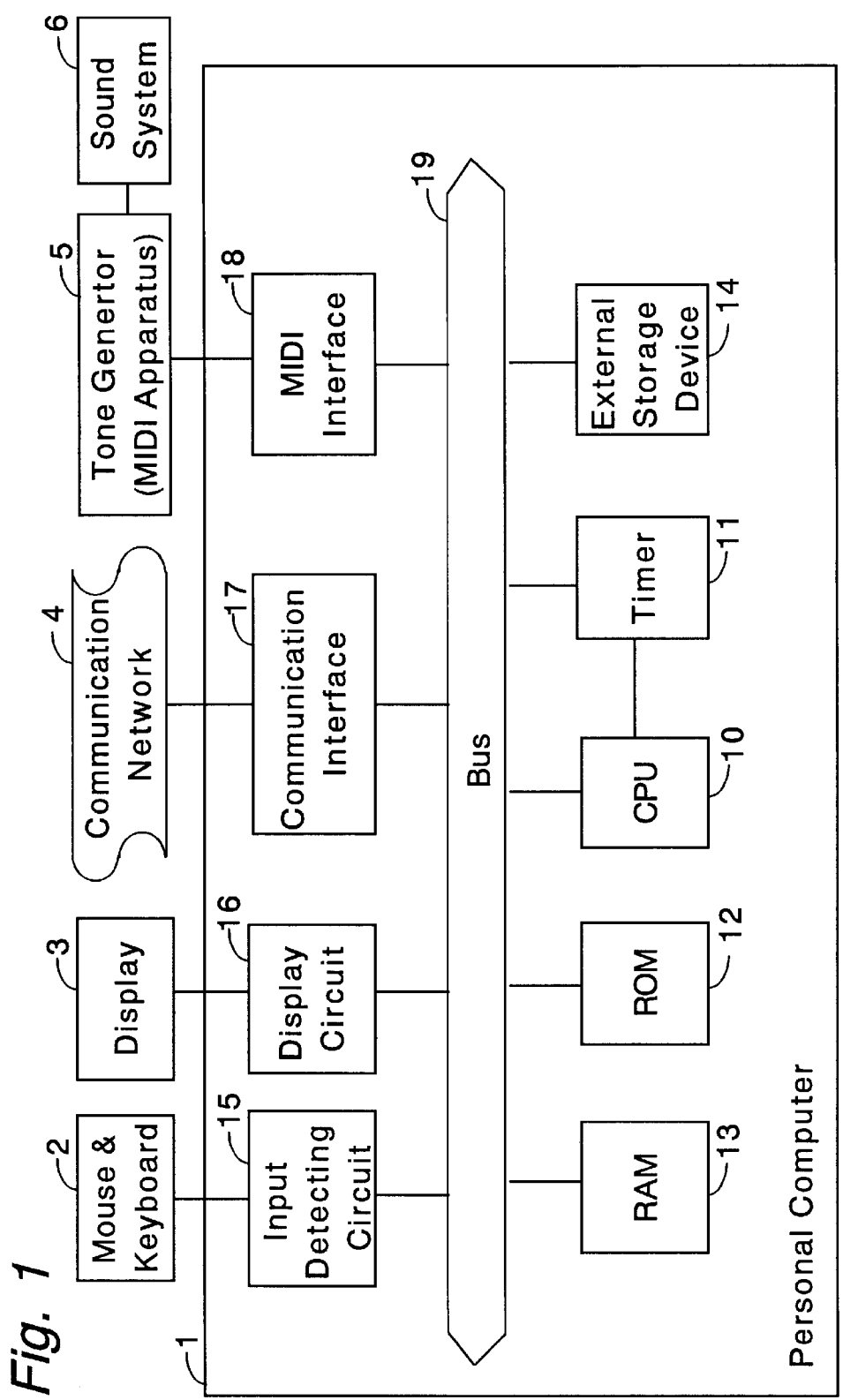
FIG. 1 is a block diagram showing a hardware structure of an example of a music score displaying apparatus exhibiting notes and signs in a controlled fashion according to the present invention.

FIG. 1 shows a general block diagram of an example of the hardware structure of a music score displaying apparatus which executes an embodiment of the control program for editing and exhibiting a music score with notes and signs according to the present invention. As shown in FIG. 1, the system is configured by using a general personal computer 1 connected with peripheral devices including a mouse and keyboard 2, a display device 3, a communication network 4, and a tone generator device or a MIDI apparatus 5 which in turn is connected to a sound system 6.

The personal computer 1 constitutes a core configuration of a music score displaying system according to the present invention, and includes a CPU (central processing unit) 10, a timer 11 for indicating a time progression and for generating timer interrupts at particular time intervals, a ROM (read only memory) 12 storing a system program and other various programs including the control program of the present invention and various data, a RAM (random access memory) 13 to serve as storage areas for music score data, note data, sign exhibit data, created tone play data, etc. as described hereinafter, and also to serve as work areas, and external storage device 14 such as an HDD, an FDD, a CD-ROM drive, an MO drive and a DVD drive for storing various application programs and data. The control program for editing and exhibiting a musical score with notes and signs according to the present invention and a sequence program to be used in association with the control program may be store in the external storage device 14 and may be transferred to the RAM 13 for execution.

The personal computer 1 further includes an input detecting circuit 15 for detecting manipulations of the input device 2 such as a keyboard and a mouse, a display circuit 16 for converting digital display data signals to analog signals and sending to the display device 3, a communication interface 17 for connecting to the communication network 4 such as a LAN (e.g. Ethernet) and Internet, and a MIDI interface 18 for sending and receiving MIDI data compiled from performance data to and from the tone generator (or MIDI apparatus) 5. All of the above units in the personal computer 1 are connected to each other via a bus 19.

FIG. 2 shows an example of a music score to be edited using the present invention. In this figure, a frame 21 denotes the range of a displayed score area which is exhibited within the score exhibiting window provided on the screen of the display device 3 when the control program is running, and FIG. 2 illustrates that the area within the frame 21 is displayed on the display screen from among the total music score as shown in FIG. 2. The exhibited elements for a musical score include notes and other musical symbols. The musical symbols include a category of musical signs associated with a plurality of notes, such signs as a tie, a slur, a slide, a bending and hammering-on (hereinafter referred to as "connective signs") and another category of musical signs not associated with a plurality of notes. The present invention concerns novel processing with respect to connective signs, whereas the events of notes in the music progression are referred to as "note events" and the events of signs in the music progression are referred to as "sign events". The note events and the sign events are exhibited on the screen according to the musical notation to constitute a music score.

There is shown in FIG. 2 a pen-shaped icon 22 indicating an object of edition, and is used to point a selected event by manipulating a mouse to delete or move to another position on the screen. The object event is determined by moving the pen-shaped icon 22 to the position of the object event of the note or the sign to be moved and clicking the right button of the mouse, and is moved to an intended position by dragging the icon 22 to the intended position and releasing the clicked right button. The icon 22 is also used to point the position to insert a new note in the score and place the intended new note there. There is also shown a sign 23 exhibited in the score, wherein the shown sign 23 with a curved line connecting two notes and a character "s" and a dot mark "." is a slide mark indicating a manipulation manner of pressing a string at the starting note pitch and picking the string, and thereafter moving (i.e. sliding) the pressing finger longitudinally to change the pitch of the tone up or down to reach the ending note pitch.

Figure 3A:
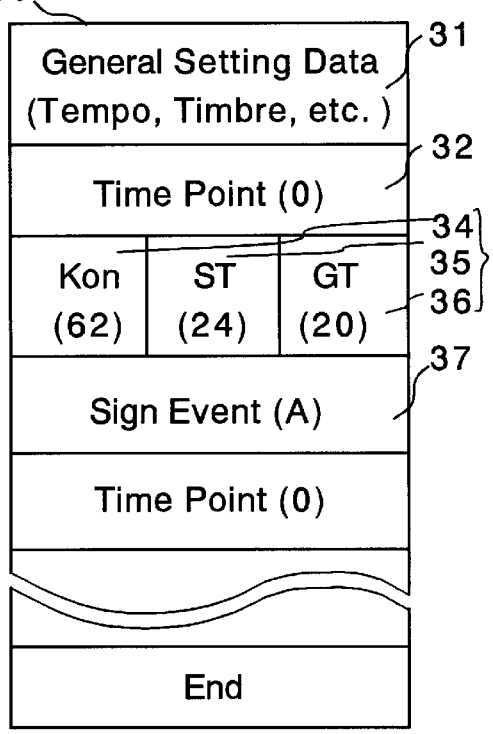
FIGS. 3a and 3b are data configuration charts showing examples of a music piece data file and a sign particulars data file, respectively, as processed in the present invention.
Figure 3B:
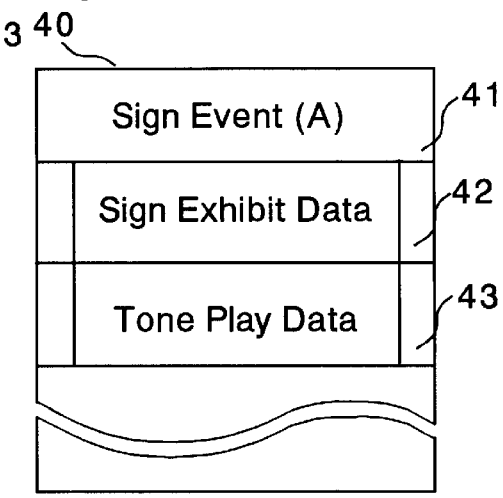

FIGS. 3a and 3b shows data configuration of the music data corresponding to the music score shown in FIG. 2. The music data include a music piece data file (performance progression data) 30 of FIG. 3a and a sign particulars data file 40 of FIG. 3b. The music piece data file 30 is in the format of a standard MIDI file (SMF) which stores time point data and note play event data (or sign event) successively according to the progression of the music. The music piece data file 30 includes a general setting data block 31 for setting a tempo, a timbre, etc., a note play event data block 33 consisting of timing data 32, key-on (Kon) data 34, step time (ST) data 35 and gate time (GT) data 36, and sign event data 37. The key-on data 34 indicates the key number representing the tone pitch of the note event, the step time data 35 indicates the duration of the note event as expressed in terms of the number of clock counts, and the gate time data 36 indicates the length of actually sounding time of the note event also as expressed in terms of the number of clock counts. In this embodiment, one measure is divided into ninety-six clocks, and the values of the timing data employed in the above various data 32, 34–36 are reset to zero at the top of each measure. The sign event data 37 corresponds to a sign event in the music progression, and stores pointer data that identifies the storage position of the sign particulars data file shown in FIG. 3b specifying the entity (contents) of the sign event. FIG. 3b depicts the data structure of the sign particulars data file 40, which contains sign event identifying data 41 corresponding to the above sign event data 37, sign exhibit data 42 and tone play data 43. The sign exhibit data 42 and the tone play data 43 will be described referring to FIG. 4 with respect to the case of FIG. 2 in which the sign event is a slide-up performance.

Figure 4:
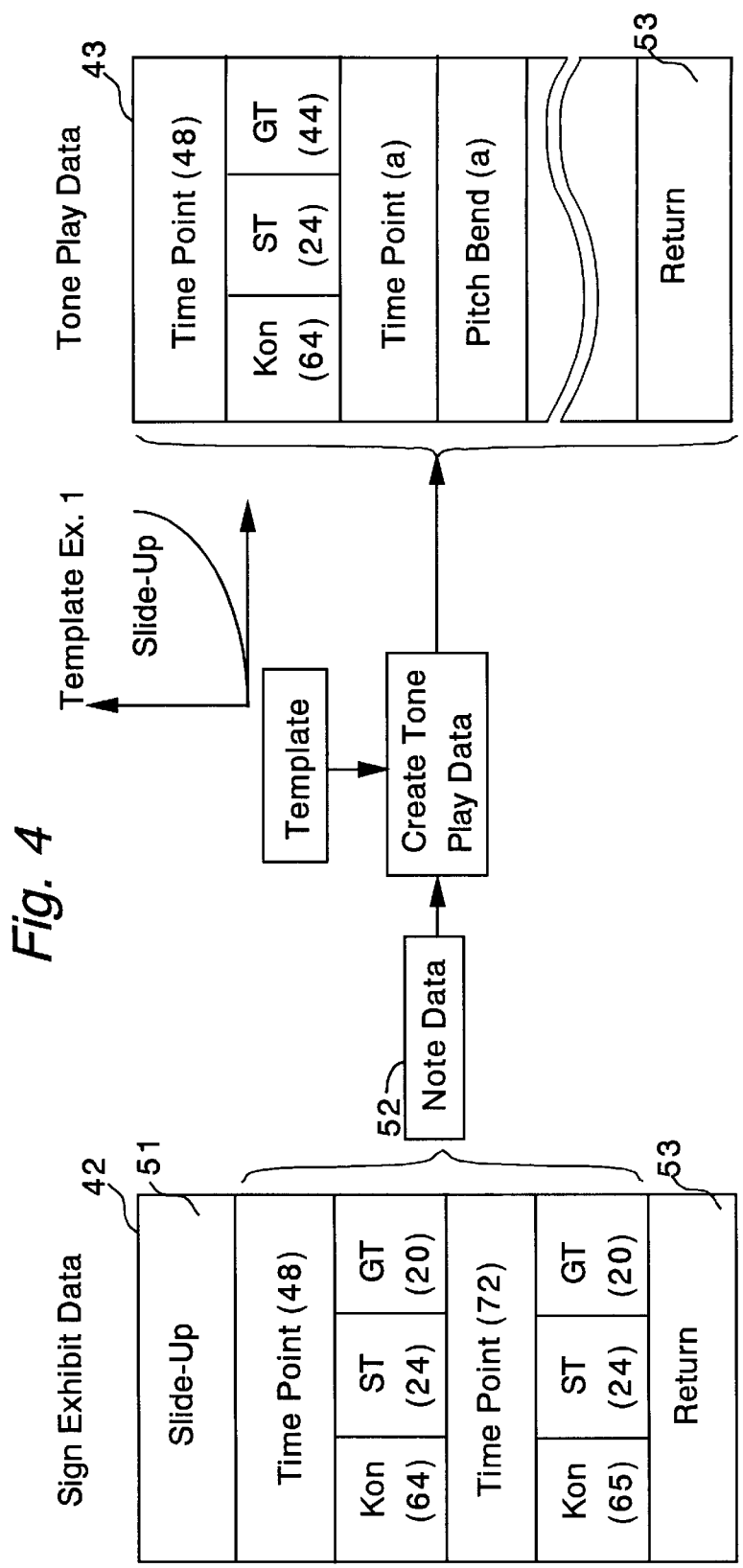
FIG. 4 is a chart showing data configurations of examples of sign exhibit data and tone play data, and how the latter data are created from the former data in the present invention.

FIG. 4 shows data configurations of examples of sign exhibit data 42 and tone play data contained in the sign particulars data file 40, and how the tone play data set 43 is created from the sign exhibit data set 42 in the present invention. The sign exhibit data set 42 contains at it top area a template nominate data piece 51 (in this example, "slide-up") which nominates a template to be used for realizing the performance effect as indicated by the sign event defined by the sign exhibit data set 42. Following the template nominate data 51, the sign exhibit data set 42 contains note event data blocks 52 one after another in succession identifying the notes covered by the sign event, each note event data block 52 consisting of time point data and note play event data, and a return code 53 at its end. The tone play data set 43 is a data set including data pieces to be actually read and used for conducting an automatic music performance, and contains data pieces designating pitches of the tones to by played for realizing the performance effect as designated by the sign event. To be more specific, the template as nominated by the template nominate data piece 51 is applied to the note event data blocks 52 in the sign exhibit data set 42 to create pitch data to be actually traced for instantaneous tone pitches with respect to the time progression for realizing the designated performance effect, thereby constituting the tone play data set 43. In the example shown in FIG. 4, the nominated template is a "slide-up" template and defines a tone pitch variation in which tone pitches slides up (i.e. rises) with respect to the lapse of time. By applying this template to the note data blocks 52 in the sign exhibit data set 42, a block of pitch bend data defining plural time points (a: a1, a2, . . . , an) and respectively corresponding pitch bend values (a: a1, a2, . . . , an) is created just after the note play event at time point "48" clock counts (i.e. the third beat in the measure) with key number "64", step time "24" and gate time "44" to gradually reach the note play event at time point "72" with key number "65". The increased gate time "44" for the key-on at the third beat time point is obtained by adding the step time value "24" for the third beat note and the gate time value "20" for the fourth beat note, and means there is no new key-on at the time point of the fourth beat. Thus a performance effect of the slide-up from the note number "64" to the note number "65".

Figure 5:
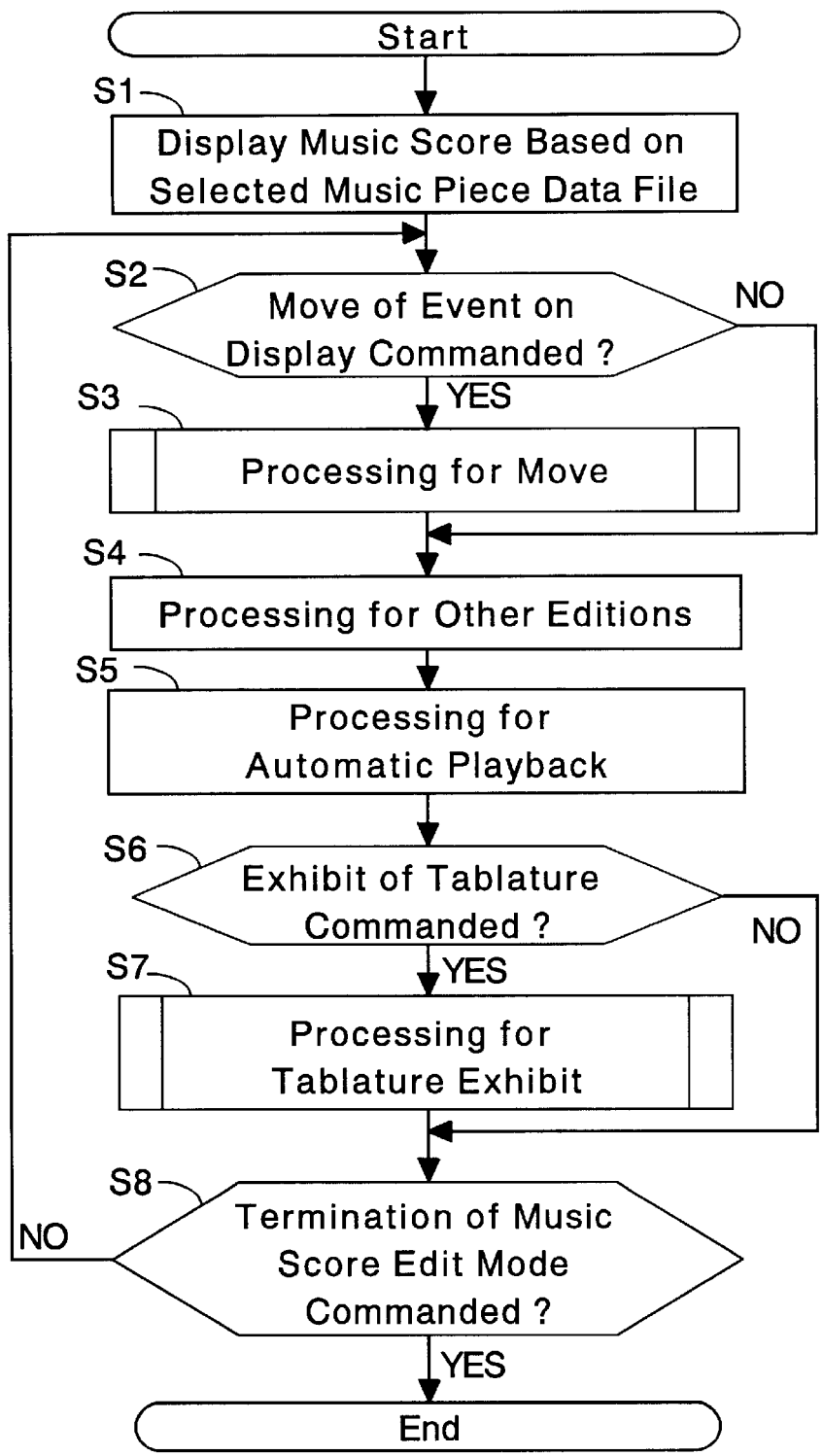
FIG. 5 is a flow chart showing an example of the music score edit mode processing according to the present invention.

FIG. 5 shows a flow chart of an example of the music score edit mode processing using the above-described music piece data file and the music score displaying screen according to the present invention. As the embodiment processing takes place at the time a sequence program is run and the music score edit mode contained in the sequence program is commanded, the description will be made herein about the processing under the operation of the music score edit mode processing in the sequence program.

As the music score edit mode is initiated, a step S1 displays a music score to be edited on the display screen 3 based on a music piece data file selected by the music selecting processing in the main routine processing of the sequence program. The music score within the music score exhibiting frame 21 shown in FIG. 2 is exhibited on the display screen 3, as the music piece data file 30 is read out from its top in the amount that can be exhibited within one frame of the screen. The process step S1 determines the time positions (i.e. on what beats) of the respective notes (or rests) in the measure to be exhibited based on the time point data 32 in the music piece data file 30, determines the pitch positions (i.e. on what lines or spaces of the stave) of the respective notes based on the pitch of the notes defined by the key-on data 34 in the note play event data 33, determines the durations of the notes based on the step time data 35 in the note play event data 33, and exhibits that amount of music score in the display window. Upon reading out sign event data 37, the step S1 exhibits the notes covered by the sign event using the note data 52 in the sign particulars data file 40, and also selects the icon (e.g. a character plus mark "s.") which corresponds to the sign event using the template nominate data 51 in the sign exhibit data 42 and exhibits the icon in association with the notes covered by the sign event. As the sign particulars data 40 contains the sign exhibit data block 42 for a sign exhibiting purpose and the tone play data block 43 for a tone playing purpose separately stored, the correspondence between the music score exhibition and the tone performance can be easily and correctly established to enhance the processing speed. When no music piece data file is selected for edition, the process step S1 exhibits a blank stave on the screen for placing notes and signs anew to construct a new music score.

Next, a step S2 judges whether a move of any event on the display is commanded. Namely, a judgment is made as to whether any note event on the screen is dragged by the pen-shaped icon 22 according to the mouse operation by the user and placed at a new position, and as to which of the event is dragged, as described above referring to FIG. 2. The events may be dragged in any direction, i.e. upward, downward, leftward or rightward. The event under move may be exhibited in a different condition (e.g. in red color) from the ordinary condition (i.e. in black color). Where there is no event move operation and the judgment at the step S2 is negative (NO), the process skips to a step S4. When an event move operation is detected, that is, the judgment at the step S2 is affirmative (YES), the process goes forward to a step S3 before moving to the step S4. The processing for event move conducted at the step S3 will be described in detail hereinafter referring to FIGS. 6a and 6b, and so forth.

The processing of the step S4 includes addition and deletion of note events and sign events, and alteration of various parameter values. These edition processes may be of any manner known and practiced in the art as would be found in music score editor software, and therefore a detailed description of the same is omitted herein for the sake of brevity. Needless to say, according to addition or deletion or move of a note event, an adequate rest will be deleted or inserted on the score to keep the measure length.

A step S5 is to conduct an automatic playback of the music piece data file. In the vicinity of the music score exhibiting window are placed switching buttons to play back a music piece, to stop the playback, to return to the top of the music piece, etc. When the user designates the playback, the automatic playback will be conducted. In the automatic playback processing, the automatic playback of the music piece is conducted by successively reading out the data in the music piece data file 30 as edited, if any, and processing the respective note play event data 33 at the respective corresponding time points indicated by the time point data 32. In case the read-out data is sign event data 37, tone play data 43 contained in the sign particulars data file 40 which is designated by the sign event data are read out successively. When the return data 53 is read out, the process returns to the reading out of the data in the music piece data file 30 to read out the data recorded just after the sign event data 37 which has been read out until that moment. Then, tone generation control signals corresponding to the successively read-out tone play events will be sent to the tone generator device 5, thereby conducting an automatic performance of a musical piece.

A step S6 judges whether an exhibit of a tablature is commanded. This judgment is made by detecting whether there is a mouse click operation on a software switch on the screen for designating the tablature exhibition, or whether there is a commanding operation for tablature exhibition through a pull-down menu. Where there is no command for tablature exhibition, the process skips to a step S8 to judge whether the termination of the music score edit mode is commanded. When there is no such a command, the process goes back to the step S2 to continue processing with respect to the selected and exhibited music score. Where there is a termination command, the music score edit mode processing is ended to return to the main routine processing. Where there is a command for tablature exhibition, the process moves forward to a step S7, and converts the presently exhibited range (on the display screen) of the music score in the ordinary five-line-stave notation to the tablature notation. Thus a tablature corresponding to the five-line-stave music score is exhibited on the screen. In displaying the tablature, the tablature may be placed on the same screen in correspondence to the five-line-stave music score, or may be exhibited on a newly prepared window for the tablature on the screen. The details of the processing for the tablature exhibition will be described hereinafter referring to FIGS. 9 and 10.

Next, the event move processing will be described in detail with respect to an example of moving a note event and a sign event, referring to FIGS. 6a, 6b, 7a, 7b, 7c, 7d, 8a, 8b and 8c. As the event move processing is started, the processing for automatically scrolling the score on the screen to meet the moves of the events is executed through steps S11 and S12 (in FIG. 6a), as long as the event move operations are continued. If an event that is being dragged (hereinafter, referred to as a "moved event") is going to go out of sight (screen region), the exhibited score will be scrolled leftward or rightward to keep the moved event in sight. This takes place by changing the read-out start position of the music piece data file 30 for display, when the coordinate position of the moved event on the screen approaches an edge of the screen. The scroll processing will take place not only in the case of the event move processing, but also in the case that the scroll bar arranged in the vicinity of the music score exhibiting screen is manipulated by the user (by means of a mouse operation).

When the step S12 detects the finish of the event move operations through a drop operation against the event move, the process moves forward to a step S13 to find the performance progression data which corresponds the moved event and to locate the data storage position which corresponds to the position of the exhibited event after the move. More specifically, the step S13 detects which data in the performance progression data 30 corresponds to the data of the moved event and stores the detected data in the performance progression data 30 into a buffer memory or the like, detects the position of the moved event after move from the coordinates on the display screen, detects which of the storage positions in the music progression data 30 corresponds to the detected coordinate, and store the coordinate (abscissa) position data (i.e. time point data) into a buffer memory.

Then, the process moves to a step S14 to judge whether the above move operation is related to a connective sign, such as a slur and a slide. The step S14 judges affirmative (YES) as the move operation relates to a connective sign, in the case (1) that the moved event is a note event which is contained in the sign particulars data file, (2) that the storage position of the ordinary note event after move is now contained in the sign particulars data file representing a connective sign, and (3) that a note event or events which did not exist within the range of a connective sign becomes within the range of the connective sign as a result of a move of another note event which was within the range of the connective sign.

In other cases, the step S14 judges negative (NO), and the process moves to a step S21 to alter the contents of the music piece data file 30 according to the move operation. That is, the tone play data corresponding to the moved event stored in the previous storage position in the music piece data file 30 before move is deleted, and the tone play data corresponding to the moved event is now store in the located storage position to store the moved event data after the move. The time point data is also altered to meet the new storage position. Then, the process moves forward to a step S22 (in FIG. 6b) to exhibit a music score on the display screen based on the altered music piece data file 30, in the same manner as described before (in ordinary fashion with respect to signs).

On the other hand, in the case that the move operation involves a connective sign, the step S14 judges affirmative (YES), and the process moves forward to a step S15 to alter the contents of the music piece data file 30 and the sign particulars data file 40 (particularly the sign exhibit data 42 therein) according to the event move. In this case, the moved event relates to a connective sign, and therefore the sign particulars data file 40 is rewritten accordingly. If a new event or events becomes to fall within the range of the connective sign as a result of the move of another note event which was included within the connective sign, as in the case of No. (3) above, the note event which is now included within the connective sign is deleted from its previous position in the music piece data file 30 and is added to the sign particulars data file 40, which process rewriting the music piece data file 30, too.

The process then proceeds to a step S16 (in FIG. 6b) to judge whether it is necessary to alter the template nominate data 51. This judgment is to judge whether the template presently nominated by the template nominate data 51 meets the contents of the new note data which has been rewritten at the preceding step S15. For example, where there are two note events connected by a slide-up sign and the latter note of the two has been move downward to have a smaller key number (lower note pitch) than the former note of the two, the performance sign for the connected notes should now be a slide-down, rather than a slide-up. This necessitates the alteration of the template nominate data 51 (of FIG. 4).

When the step S16 Judges that the alteration of the template nominate data is necessary, the process moves forward to a step S17 to alter the contents of the template nominate data according to the renewed note data. Namely, the contents of the template nominate data is now altered to nominate the most appropriate template for the note data after the edition in view of the variation inclination in note pitch and the previously nominated template. For example, in the case where the preceding nominated template was a slide-up and the pitch change inclination has become inverse, a slide-down is now employed for the new template. The alteration rule for the template nomination data is predetermined according to the inclination change in pitch due to the note event move, and the template nomination data will be altered accordingly in response to the move of the note event.

After the processing at the step S17 is over, or when the judgment at the step S16 is negative (NO), the process moves to a step S18. The step S18 rewrites the contents of the tone play data 43 in the sign particulars data file 40 in which the sign exhibit data 42 is altered. Thus the result of the edition can be faithfully reflected in the automatic playback of the musical data as mentioned before.

The process then moves to a step S19 to judge whether it is impossible to exhibit a note event (or events) which is connected to the moved event on the same range of the display screen concurrently. This means that there may be an occasion in which the display screen is scrolled in accordance with the move of the note event and some of the connected events will get out of the screen range, depending on the amount of the move, though. If all of the note events connected by the sign event can be exhibited on a single range of the display screen concurrently, the judgment at the step S19 is negative (NO), and the process goes to a step S22 to display the music score according to the altered data in the ordinary fashion.

When all of the note events connected by the same sign event cannot be exhibited concurrently on a single screen range in connection with the move of the note event, the judgment at the step S19 rules affirmative and the process moves to a step 20 to display the music score by altering the exhibit of the connection sign to a special fashion that is different from the ordinary fashion as defined and employed in the regular musical notation. Namely, the connective sign is exhibited in a different fashion than the ordinary style of the connective sign in the vicinity of the note event (this is one of the note events connected by the connective sign) exhibited on the display screen so that the user can clearly understand what kind of connective sign it is, even though a fractional part of the connective sign is exhibited on the screen. An example of the special fashion may be to exhibit, in the vicinity of the note concerned and exhibited on the screen, a fractional arcuate line directed toward another note which is connected by the connective sign but is not exhibited on the same screen together with a character indicative of the substance of the connective sign. This fashion will facilitate the user's clear recognition of the meaning of the connective sign and prevents the complication of the music score due to a long arcuate line obstructing the musical score.

More specific description will now be made herein with respect to examples of note event moves according to the above-described event move processing, referring to FIGS. 7a–7d and 8a–8c. The examples shown are to assume the exhibited condition of the music score as shown in FIG. 2 before move and to assume the exhibited conditions of the musical score as shown in FIGS. 7a–7d and 8a–8c after move.

FIG. 7a shows an example of a music score of the case in which the quarter-note at the fourth beat position in the measure and accompanied by the pen-shaped icon 22 in FIG. 2 has been moved to the second beat position (time point of "24" clock counts) in the measure and its pitch has been changed to the position of key number "71" by the event move operation. As will be understood from the figures, a slide-up performance before the move has been changed to a slide-down performance after the move. As described before, the rest is to be automatically adjusted, and accordingly the rest which existed at the second beat position in FIG. 2 has been deleted and a new rest is placed at the fourth beat position in FIG. 7a.

Figures 7B, 7C, 7D:
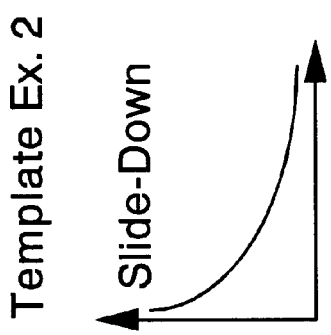
FIGS. 7b, 7c and 7d are charts showing a data configuration of an example of sign exhibit data, a graph of an example of a pitch variation template, and a data configuration of an example of tone play data created from the sign exhibit data using the pitch variation template, respectively, in the present invention.

FIG. 7b shows the sign exhibit data 42 after the move, FIG. 7c shows the pitch variation template to be nominated after the move, and FIG. 7d shows the tone play data 43 after the move. In FIGS. 7b and 7d, the grayed portions indicates the altered data in connection with the move. As the event move is within the span of the sign (i.e. the sign covered two notes before the move, and the sign covers the same two object notes after the move), the music piece data file itself is not altered in this example.

In this embodiment, the step S15 of FIG. 6a inserts a note event of key number "71" at time point "24" before the note event of key number "64" at time point "48" in the sign exhibit data 42. The inserted note event corresponds the note event on the screen as dragged by the mouse operation. The step S16 of FIG. 6b judges that it is necessary to alter the template nominate data, and accordingly the step S17 alters the contents of the template nominate data 51 from "slide-up" (before move) to "slide-down". Thus, the template of slide-down (as shown in FIG. 7c) as nominated by the altered template nominate data 51 is applied to the above altered sign exhibit data 42 to create new tone play data 43 as shown in FIG. 7d. In the illustrated example, a plurality of time point data (b) and a corresponding plurality of pitch bend data (b) are created starting at the pitch of key number "71" and reaching the pitch of key number "64" based on the above rewritten sign exhibit data 42 according to the event move. This produces tone play data 43 representing down-going slide performance. And then, the step S22 displays the music score according to the altered data. Namely, the note event after the move and the associated connective sign (in this case, a slide-down sign) are automatically exhibited at the intended location.

FIG. 8a shows an example of a music score of the case in which the quarter-note at the fourth beat position in the measure and accompanied by the pen-shaped icon 22 in FIG. 2 has been moved rightward widely to the fourth beat position (time point of "72" clock counts) in the next measure and its pitch is kept unchanged at the position of key number "65" by the event move operation. In this situation, the exhibited range on the screen is scrolled in connection with the event move, and the other note event connected with the moved note event by the sign is shifted out of screen range 21 so that the two notes connected by the sign cannot be exhibited on the same screen range concurrently. Therefore in this case, the step S19 (FIG. 6b) judges affirmative (YES) and the process moves to the step S20 to alter the exhibit of the connective sign (slide-up, here) to a special fashion, in which the right half of the slur mark for the slide indication is exhibited adjacent to the moved note event with a character "s."attached beneath the half slur mark to indicate the slide. This is an easily understandable indication for the player.

FIG. 8b shows the sign exhibit data 42 after the move, in which time point data ("0") is inserted before time point data ("72") to indicate the event at time point "72" is the one in the next measure. The time point data ("0") indicating the first measure also means a bar line, i.e. the top of a measure. The template nominate data 51 has not been changed, as the pitch variation inclination, i.e. the slide direction stays the same. FIG. 8c shows the tone play data 43 after the move. In FIGS. 8b and 8c, the grayed portions indicates the altered data in connection with the move. According to the alteration of the sign exhibit data 42 responsive to the event move, the ending time for the slide effect is shifted to the fourth beat point of the next measure, and accordingly the gate time GT at time point "48" in the first measure is increased to "140" by adding a value "96" (one measure length) to the value "44" (shown in FIG. 4). Further according to the above data alteration, time points (c) and pitch bends (c) are newly created to meet such an elongated slide performance.

The processing of altering the exhibit fashion of the connective sign will be employed not only in the case where the notes connected by a connective sign cannot be exhibited on the same screen range due to a wide event move, but also in the case where the user scrolls the screen to see a concerned portion of the music score using a scroll bar on the screen arbitrarily.

Next a description will be made with respect to the processing for tablature exhibition, corresponding to the step S7 in FIG. 5 with reference to the flow chart of FIG. 9 and the exhibiting manners of FIG. 10. As the tablature exhibit processing is started, a step S31 sets the starting position for reading out the music piece data file. Where there is a music score exhibited on the display screen and when a command for tablature exhibit is given, the tablature exhibit processing is to exhibit a tablature of the same span of the music piece as is exhibited in the ordinary music score notation on the display screen. In this connection, the step S31 sets the event (event data in the music piece data file 30 or in the sign particulars data file 40) that corresponds to the top position of the score exhibited in the screen range at present to be the start position for read-out. A step S32 then reads out data for one event from the start position. With respect to the ordinary performance progression data, the data to be read out as one event includes time point data 32 and note play event data 33 to define one tone to be generated, whereas with respect to the music score having performance signs, the data indicating one performance sign is read out as one event.

A step S33 converts the note number Kon included in the note play event data 33 for one event or in the sign exhibit data 42 to the corresponding string/fret number. This process is conducted by looking up a conversion table about note numbers versus strings and fret-numbers and determining the string and the fret number that correspond to the note number in the read-out event. A step S34 judges whether the read-out event is a sign event.

When the read-out event is a sign event, the process goes to a step S35 to judge whether the read-out sign event is an event which necessitates a special fashion exhibit by consulting the corresponding template. If the sign event is a bending (or sometimes termed choking) which is a performance manner on the stringed musical instrument such as a guitar in which a string is picked while it is being pressed at a fret and is then pushed up or down perpendicularly to vary the tone pitch, or arming which is a performance manner on the electric guitar in which the tremolo arm is swung to vary the pitches of all the strings up and down, or the like, the tone pitch is varied without changing the fret position to press, and therefore the fret number from the conversion table cannot be used as it is. Thus the bending (choking) and the arming are judged to be sign events which necessitate a special fashion exhibit. Also, some particular sign event which follows a bending or an arming will be judged as a sign event which necessitates a special fashion exhibit.

When the read-out sign event is an event that necessitates a special fashion exhibit, the step S35 judges affirmative (YES) and the process moves to a step S36. The step S36 further converts the heretofore obtained regular string/fret number to the string/fret number for an event necessitating a special fashion exhibit according to the substance of the sign event. A plurality of fret numbers existing in the read-out sign event are converted to a fret number which matches the sign (performance manner) according to the predetermined rule. The rule for the reconversion is previously defined for each type of sign event which necessitates a special fashion exhibit. And a step S37 exhibits the reconverted string/fret number or other mark at the corresponding position on the tablature.

When the read-out event is an ordinary event (note event), the step S34 judges negative (NO) and the process moves to the step S37. When the read-out event is not a sign event that necessitates a special fashion exhibit, the step S35 judges negative (NO) and the process moves to the step S37, too. The step S37 exhibits the string/fret number as converted by the ordinary conversion table at the step S33 without further alteration. Among the sign events that do not necessitate a special fashion exhibit, examples are a hammering-on, a pulling, a trill and a slide.

A step S38 judges whether there is any more event in the exhibited range of the musical score to be converted to tablature notation. If the heretofore processed event is not the last event in the exhibited range, there certainly is further event left in the exhibited range, and therefore the step S38 judges affirmative (YES) and the process goes back to the step to read out the next event to repeat the above processing of converting the exhibited event in the ordinary musical notation to a tablature notation. If the heretofore processed event is the last event in the exhibited range, there is no further event left for the tablature notation, and therefore the step S38 judges negative (NO) and the processing comes to an end.

FIG. 10 shows examples of the conversion from the ordinary musical notation to the tablature notation. Example 1 is a case where the read-out sign event is a bending (choking). The fret numbers converted from the note numbers "64" (note E4 on the stave) and "65" (note F4 on the stave) at the step S33 were "2" and "3" on the fourth string (D3 string, the actual tones produced on the strings being one octave lower than the notes on the stave notation in the case of the guitar), although not shown here, are flier converted to be "2" and "2" at the step S36, which result is shown here with an indication of a slur mark and "cho" characters.

Example 2 is a case where the read-out sign events are hammering-on which does not require a further conversion for the tablature notation. The fret numbers converted from the note numbers "64", "65" and "67" at the step S33 are "2", "3" and "5" on the fourth string are exhibited on the tablature notation as they are from the ordinary conversion table. The result is shown here with an indication of slur marks and "H.O" characters.

Example 3 is a case where the read-out sign events are consecutive bendings (chokings). The fret numbers converted from the note numbers "64", "65" and "67" at the step S33 were "2", "3" and "5" on the fourth string, although not shown here, are further converted to be "2", "2" and "2" at the step S36, that is, the fret numbers are unified to the smallest number "2" for the three different notes, which result is shown here with an indication of two slur marks and "cho" characters.

Example 4 is a case where the readout sign events are a bending (choking) and a hammering-on in succession. The fret numbers converted from the note numbers "64", "65" and "67" at the step S33 were "2", "3" and "5"on the fourth string, although not shown here, are further converted to be "2", "2" and "4" at the step S36, that is, the fret number for the second note which is connected with the first note by a "bending" sign is unified to the smallest number "2", while the fret number for the third note which is connected with the second note by a "hammering-on" sip is made to be "4" which is obtained by shifting the preceding fret number "2" by an amount corresponding to the note interval between the preceding note F4 and the present note G4, which result is shown here with an indication of a slur mark with "cho" characters and a slur mark with "H.O" characters. As will be understood from the above description, a hammering-on sign which follows a bending (choking) sign is judged by the step S35 to be a sign event which necessitates a special fashion exhibit, and the fret number obtained at the step S33 through the ordinary conversion table is subject to a further conversion at the step S36.

Thus, the present invention provides more correct indications in the tablature notation than the conventional apparatus.

In the note event move processing, however, it is recommended that a note among the notes which are connected by a bending (choking) sign should be moved with care that the front note should not bear a higher pitch than the rear note to prevent the occurrence of an unperformable sign description on the score. The apparatus may include some controlling function not to permit such an event move. Alternatively, the program may be such that the user's operation for such a move may be interpreted to be a bending (choking) with the same pitched notes while not altering the template concerning the bending (choking) performance. Or alternatively, the program may be such that the choking sign should be automatically deleted in the case where an impermissible note event move is commanded.

Although the above description has been made about an embodiment in which a music score display control program is activated from the music score mode in a sequence program, the present invention can be practiced in the form of a music score writing program or a separate music score display edit program, or a discrete music score display apparatus. Further, the special fashions of exhibiting the signs may not necessarily be limited to the examples shown here, but may be modified in various ways, such as adding some indications to represent which notes are associated with which sign by, for example, imparting numerals or characters to a bending (choking) sign, or giving a particular color to a bending (choking) sign and the associated notes to be easily recognizable.

The tone generator or MIDI apparatus 5 may be structured by separate devices connected with each other by means of MIDI cables or various communication net works, or may be configured by a personal computer and application software.

The data format for the musical data may be of any type such as a "relative time+event" type which represents the time point of an event by a time lapse from the preceding event, an "absolute time+event" type which represents the time point of an event by an absolute time position from the top of the music piece or the top of each measure, a "note pitch (rest)+duration" type which represents the progression of music by aligning notes, each defined by the pitch and the duration, and rests, each defined by the duration (no pitch), and a "direct memory mapping" type in which memory regions are secured (allotted) for all the available time points under the minimum resolution of time progression for the music and each performance event is written at a memory region which is allotted to the time point for such each event.

The music score display control program may be stored in a server computer or the like connected with the apparatus of the present invention via the above-mentioned communication network 4 and may be downloaded from the server computer to the personal computer 1 for use.

As will be understood from the above description, the user can recognize the contents of the displayed musical score on the screen easily and correctly by using the music score display control apparatus and the music score display control program according to the present invention. With the apparatus and the program of the present invention, a music score as intended by the user will be exhibited correctly, and music performance data as intended by the user can be correctly created, which facilitates the edition of music performance data with enhanced maneuverability and recognizability. Further, it will be easily and correctly recognized as to which notational signs relate which notes on the screen, even when all the related notes are concurrently displayed on the screen. As the musical signs are exhibited in a clean and recognizable fashion, the music score is not complicated and has enhanced legibility. Further, a tablature indicates correct indications for manipulation of the stringed musical instrument, and will be very useful for practicing the instrument like the guitar.

While particular embodiments of the invention and particular modification have been described, it will, of course, be understood by those skilled in the art without departing from the spirit of the present invention so that the invention is not limited thereto, since further modifications may be made by those skilled in the art, particularly in light of the foregoing teachings. It is therefore contemplated by the appended claims to cover any such modifications that incorporate those features of these improvements in the true spirit and scope of the invention.

What is claimed is:

1. A music score display apparatus comprising:
   a musical data providing module which provides musical data representing events of notes and events of signs for a musical performance, said signs including at least one connective sign connecting plural notes;
   a display module which displays on a display screen a music score by exhibiting said events in musical notation based on said musical data;
   an edit module which permits edition of said music data by moving at least one exhibited note event at one position to another position on said score; and
   an alteration module which, in case said moved note event is connected with another note event with an exhibited connective sign, is capable of altering said exhibited connective sign, thereby keeping association of said exhibited connective sign with said moved note event and said other note event.

2. A music score display apparatus as claimed in claim 1, wherein said connective sign is at least one selected from the group consisting of a tie, a slur, a slide, a bending and a hammering on.

3. A music score display apparatus as claimed in claim 1, wherein said moving of the note event is in at least one direction from among a note pitch direction and a time progression direction.

4. A music score display apparatus as claimed in claim 1, wherein said musical data include sign exhibit data for exhibiting a sign event and note play data for playing notes according to said sign event, and wherein, in case said sign exhibit data is altered, said note play data which correspond to said sign event will also be altered.

5. A music score display apparatus as claimed in claim 4, further comprising a tone play data creating module which creates tone play data indicative of tones to be played for realizing a performance as designated by said connective sign, said tone play data creating module including at least one template defining a manner of change in tone pitch;

wherein said sign exhibit data includes template nominating data which nominates a template for nominating a template to be employed for the note event associated with said sign exhibit data, and said sign exhibit data further include note data to be associated with said sign exhibit data.

6. A music score display apparatus as claimed in claim 5, wherein said tone play data creating module creates tone play data based on said template nominated by said template nominating data and on said note data for which said template is to be employed.

7. A music score display apparatus as claimed in claim 6, wherein said tone play data creating module selects an appropriate template from said at least one template and rewrites said tone play data in accordance with said moving of the note event.

8. A music score display apparatus comprising:
a musical data providing module which provides musical data representing events of notes and events of signs for a musical performance, said signs including at least one connective sign connecting plural notes;
a display module which displays on a display screen a music score by exhibiting said events in musical notation based on said musical data; and
a display control module which controls said display module to exhibit a connective sign in a special fashion which is different from the ordinary fashion of exhibiting said connective sign, in case said notes connected by said connective sign cannot be exhibited on said screen range concurrently.

9. A music score display apparatus as claimed in claim 8, wherein said special fashion is an exhibit of a fractional part of said connective sign and a character indicating said connective sign.

10. A music score display apparatus as claimed in claim 8, further comprising an edit module which permits edition of said music data by moving at least one exhibited note event at one position to another position on said score;
wherein said display control module controls said display module to exhibit a connective sign in said special fashion, in case said notes connected by said connective sign cannot be exhibited on said screen range concurrently as a result of said moving of the note event.

11. A music score display apparatus as claimed in claim 10, wherein said special fashion is an exhibit of a fractional part of said connective sign and a character indicating said connective sign.

12. A music score display apparatus comprising:
a musical data providing module which provides musical data representing events of notes and events of signs for a musical performance, said signs including at least one connective sign connecting plural notes;
a display module which displays on a display screen a music score by exhibiting said events in musical notation based on said musical data;
a tablature data providing module which provides tablature data for exhibiting said events in tablature notation from said musical data, said tablature notation including strings and fret numbers of a stringed musical instrument;
a display control module which controls said display module to display a tablature for said musical performance based on said tablature data corresponding to said musical notation.

13. A music score display apparatus as claimed in claim 12, wherein said display control module controls said display module to exhibit a first note event in a special fashion in case a sign event associated with said first note event is of a first category which necessitates a special fashion exhibition whereas to exhibit a second note event in an ordinary fashion in case a sign event associated with said second note event is of a second category which does not necessitate a special fashion exhibition.

14. A music score display apparatus as claimed in claim 13, wherein said sign event of said first category is at least one of bending and arming.

15. A music score display apparatus as claimed in claim 13, wherein said sign event of said second category is at least one of hammering on, pulling, trill and slide.

16. A music score display apparatus as claimed in claim 13, wherein said display control module controls said display module to exhibit the fret numbers corresponding to the notes in the ordinary relation in case the associated sign event is of said second category whereas to exhibit the fret numbers corresponding to the notes in a special relation which is specifically defined depending on the sign event and is different from said ordinary relation in case the associated sign event is of said first category.

17. A storage medium storing a program that is executable by a computer, the program comprising:
a module for providing musical data representing events of notes and events of signs for a musical performance, said signs including at least one connective sign connecting plural notes;
a module for displaying on a display screen a music score by exhibiting said events in musical notation based on said musical data;
a module for permitting edition of said music data by moving at least one exhibited note event at one position to another position on said score; and
a module for altering, in case said moved note event is connected with another note event with an exhibited connective sign, said exhibited connective sign, thereby keeping association of said exhibited connective sign with said moved note event and said other note event.

18. A storage medium storing a program that is executable by a computer, the program comprising:
a module for providing musical data representing events of notes and events of signs for a musical performance, said signs including at least one connective sign connecting plural notes;
a module for displaying on a display screen a music score by exhibiting said events in musical notation based on said musical data;
a module for permitting edition of said music data by moving at least one exhibited note event at one position to another position on said score; and a module for controlling said displaying on said display screen to exhibit a connective sign in a special fashion which is different from the ordinary fashion of exhibiting said connective sign, in case said notes connected by said connective sign cannot be exhibited on said screen concurrently as a result of said moving of the note event.

19. A storage medium storing a program that is executable by a computer, the program comprising:

a module for providing musical data representing events of notes and events of signs for a musical performance, said signs including at least one connective sign connecting plural notes;

a module for displaying on a display screen a music score by exhibiting said events in musical notation based on said musical data;

a module for providing tablature data for exhibiting said events in tablature notation from said musical data, said tablature notation including strings and fret numbers of a stringed musical instrument;

a module for controlling said displaying on said display screen to display a tablature for said musical performance based on said tablature data corresponding to said musical notation.

* * * * *